Figures 3, 4, 5, 6, 7:
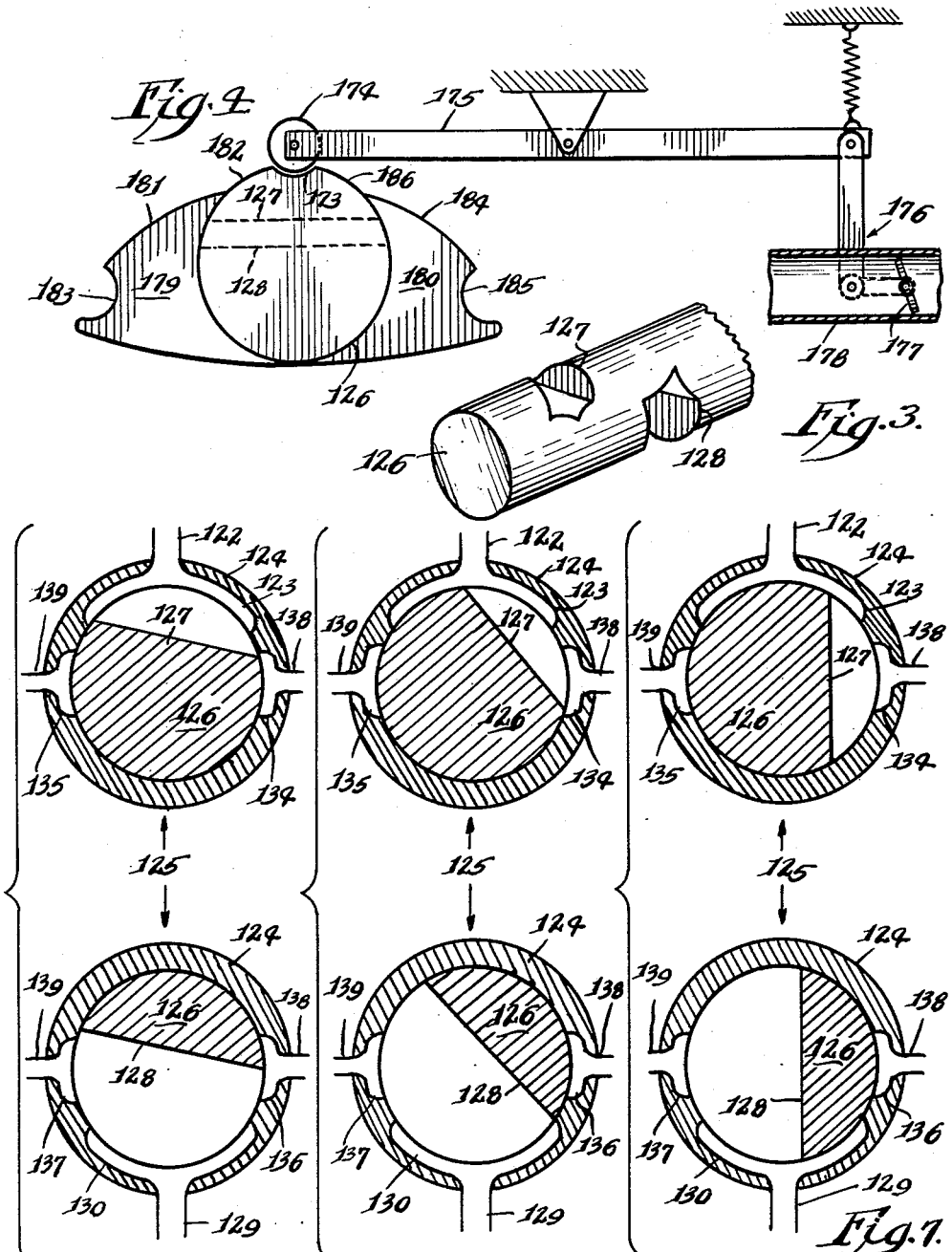

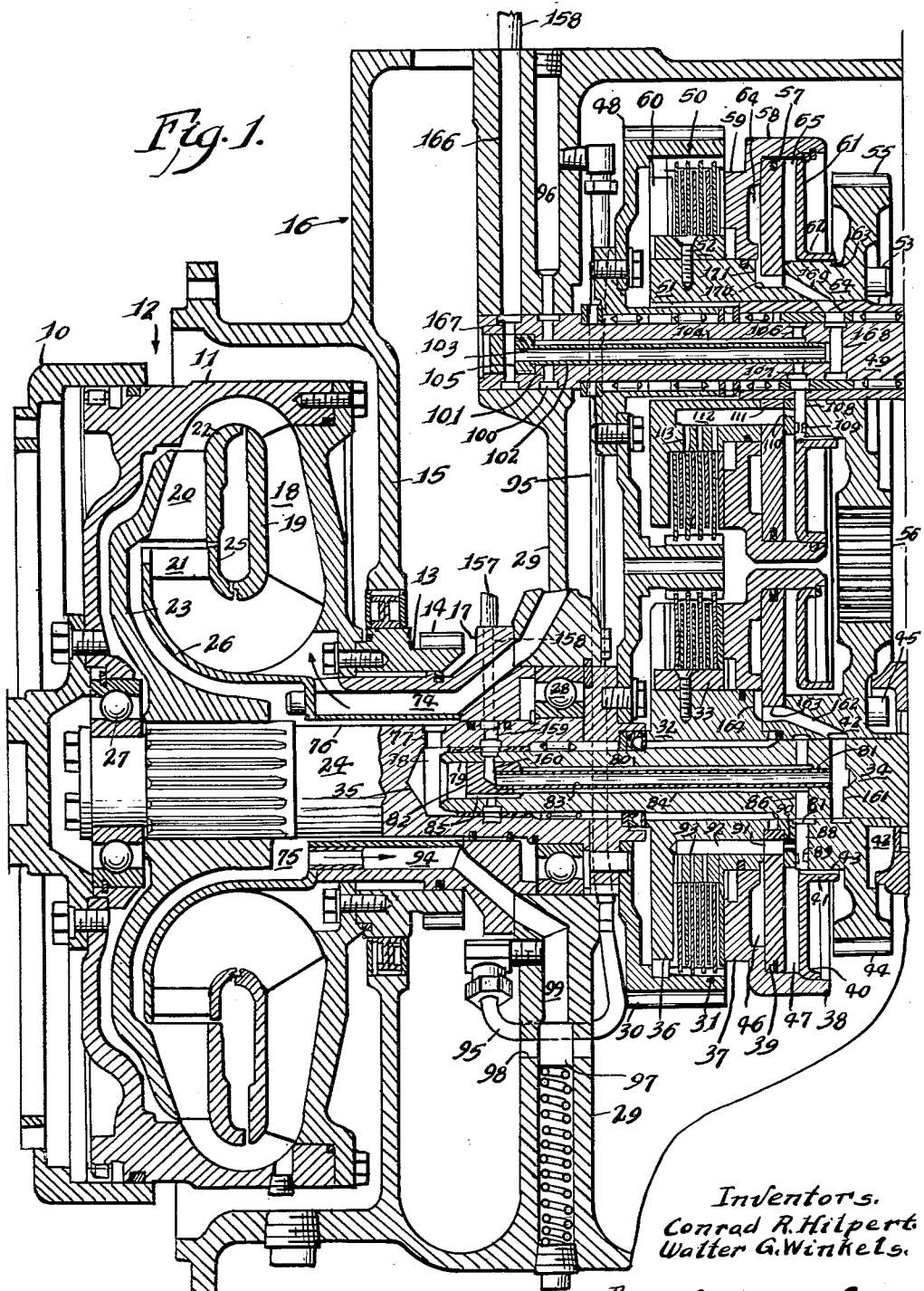

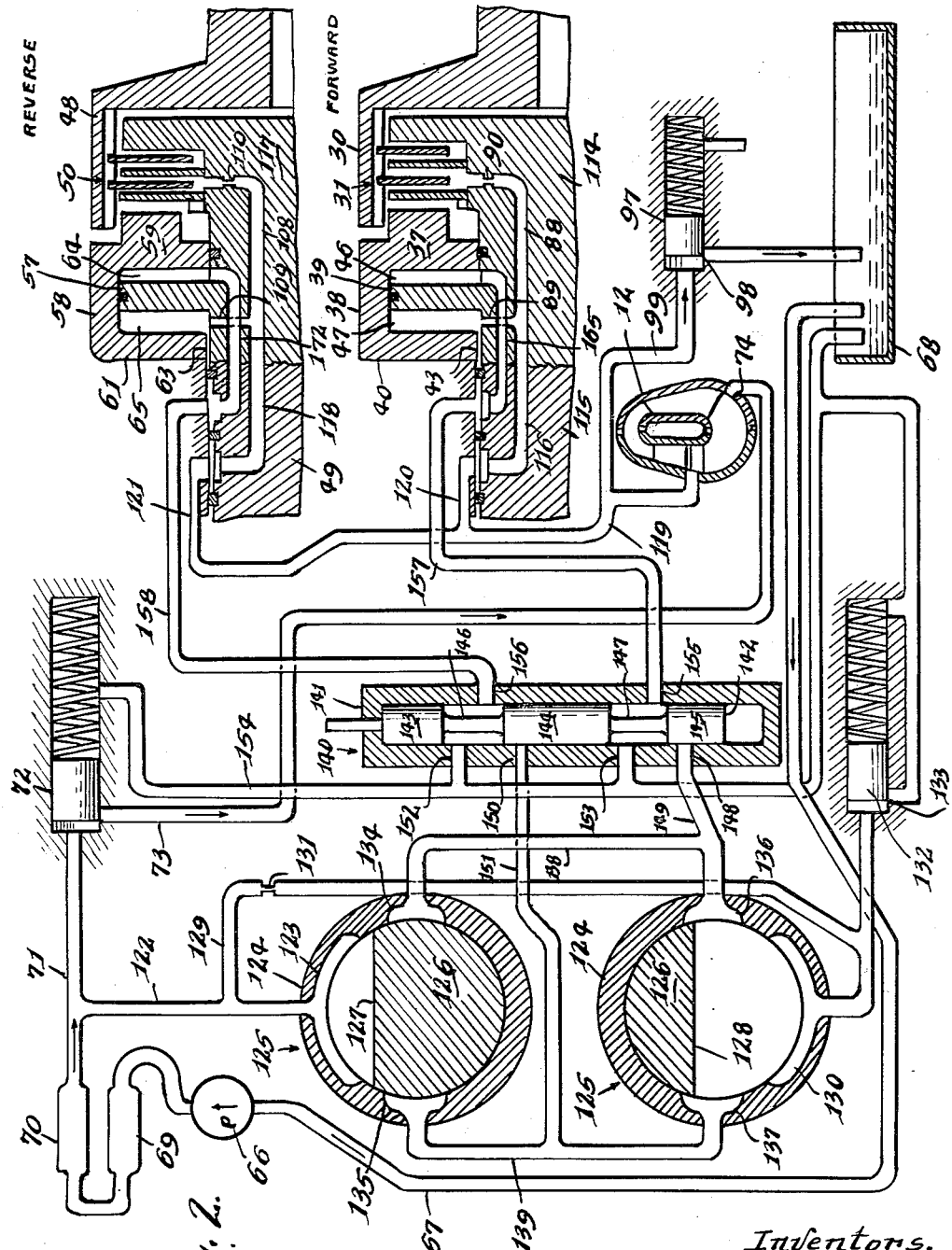

Nov. 12, 1963    C. R. HILPERT ETAL    3,110,196
POWER TRANSMISSION
Filed June 26, 1961    3 Sheets-Sheet 3

Inventors.
Conrad R. Hilpert
Walter G. Winkels.

By John W Darley
Attorney.

3,110,196
POWER TRANSMISSION
Conrad R. Hilpert, Winnebago, and Walter G. Winkels, Rockford, Ill., assignors to Twin Disc Clutch Company, Racine, Wis., a corporation of Wisconsin
Filed June 26, 1961, Ser. No. 128,288
16 Claims. (Cl. 74—645)

Our invention relates to power transmissions intended primarily for heavy duty vehicles of the wheeled and crawler type such as tractors, bulldozers, graders and the like.

Power transmissions of this type usually include serially in the power train aft of the engine an hydraulic torque converter, a pair of hydraulically actuated, friction clutches for forward and reverse movements, respectively, and a manually selective gear transmission. Problems involved in known transmissions of this character reside in the time involved in moving the clutch plates from full release to full engagement, termed the hydraulic freeplay, inability to fully engage the clutches without jerk, and the absence of any control relation between engine speed and the application of maximum engaging pressure to the clutches.

It is therefore one object of our invention to provide a power transmission of the type indicated in which the clutch plates, except when making a shift in the gear transmission, are either fully engaged by a relatively high pressure for maximum torque output or are in relative sliding contact at a relatively low pressure, both conditions and any intervening torque transmitting condition being under the full control of the operator.

A further object is the provision whereby the operator can fully control the appliaction of pressure to a clutch between the relative sliding and full engagement of the plates thereof.

A further object is to provide a transmission of the character indicated wherein the application of engaging pressure to a clutch is linked with a control on the engine fuel supply and hence speed of the engine to reduce heat load on the clutches and eliminate jerk so as to obtain optimum, smooth acceleration from the operation of the hydraulic torque converter.

A further object is the provision of a power transmission incorporating a plurality of hydraulically actuated, friction plate clutches which are selectively engaged to produce a desired power flow, the plates of each clutch when not providing such power flow being maintained in sliding contact to thereby eliminate freeplay and enable any clutch to be engaged for power flow without jerk.

In the drawings:
FIG. 1 is a sectional elevation of the transmission with the forward and reverse clutches disengaged.
FIG. 2 is a schematic view, partly in section, of the hydraulic system including the clutches and torque converter and the rotary control valve, the latter being shown by upper and lower, transverse sections, respectively, through the upwardly and downwardly extending notches in FIG. 3.
FIG. 3 is a fragmentary and reduced, isometric view of the control valve showing the notch-like formations which, in conjunction with the associated casing, provide for pressure control on the cluthes.
FIG. 4 is an end view of the stem of the control valve, exclusive of the valve casing, showing the cam means for determining the actuation of a mechanism for controlling the fuel supply to an engine providing the power source in relation to pressure supply to the cluthes.
FIGS. 5, 6 and 7 are transverse sectional and schematic views of the control valve, similar to those shown in FIG. 2, showing successive positions thereof for supplying maximum engaging pressure to the forward clutch while maintaining a substantially lower pressure on the reverse clutch which is sufficient to maintain the plates thereof in slipping contact.

By way of example, the transmission will be described as having two clutches for respectively effecting forward and reverse drives through an associated gear transmission, but is not restricted thereto since the drives may all be forward to different shafts. Further, the precise control clutch pressure application in relation to engine speed is capable of use with one clutch.

Referring to FIG. 1, the numeral 10 designates an annular, internally toothed member which is connected to a power source, such as an internal combustion engine (not shown), and which has driving connection with an annularly toothed portion at one axial end of a rotating housing 11 forming part of an hydraulic torque converter 12. At the opposite axial end, the housing 11 is fast to a sleeve 13 which is coaxial with the axis of the converter 12 and includes a gear 14 for driving a pump that services the hydraulic portions of the transmission, all as presently described. The sleeve 13 is sealably interposed between a transverse wall 15 forming part of a stationary housing 16 and a coaxial sleeve 17 that is suitably fast to the housing 16.

The housing 11 carries outflow impeller blades 18 which are bridged therebetween and a core ring 19 and the working liquid, assumed to be a suitable oil, discharged by the impeller blades moves successively through inflow turbine and stator blades 20 and 21, respectively. The turbine blades 20 are bridged between a core ring 22 and a ring 23 which has splined connection with a turbine shaft 24 which constitutes the output of the converter 12, while the stator blades 21 are bridged between a core ring 25 and a ring 26 that is fast to the sleeve 17.

The left end of the shaft 24 is piloted in a bearing 27 carried by the housing 11 and its right end is journaled in a bearing 28 carried by a second transverse wall 29 of the stationary housing 16 and which is in abutting relation to the adjacent end of the sleeve 17.

The right or output end of the turbine shaft 24 is connected to a gear 30 which is internally splined for driving and relative sliding engagement with a plurality of alternate clutch plates forming part of a forward clutch stack 31. The intervening or driven plates of this stack have driving and relative sliding engagement with a hub 32 by means of a plurality of keys 33 spaced around and connected to the hub 32 which has splined connection with the middle portion of an output shaft 34 that is coaxial with the turbine shaft 24 and whose right end is suitably journaled and assumed to be connected with a manually selective gear transmission (not shown) of conventional type. The left end of the output shaft 34 is received and suitably piloted within a counterbore 35 provided in the adjacent end of the turbine shaft 24.

The plates of the forward clutch stack 31 are gripped against an abutment ring 36, preferably integral with the hub 32, by means of an annular piston 37 which is sealably slidable on the hub 32 and is integral with one end of a cylindrical shell 38 that is sealably slidable on the periphery of an annular reaction plate 39 that is held against axial movements. The opposite end of the shell 38 is fast to an annular piston 40 whose inner portion is annularly flanged at 41 and spaced from the perihery of a hub 42 to include therebetween an annular throttling passage 43 for a purpose presently explained. The hub 42 forms part of a gear 44 that is secured to the hub 32 for rotation therewith by a plurality of pins 45, only one being shown, the reaction plate 39 fitting between and rotating with the hubs 32 and 42.

Included between the pistons 37, shell 38, reaction plate 39 and the hub 32 is a clutch engaging chamber 46, and between the shell 38, reaction plate 39, piston 40 and hub 42 is a balance chamber 47. As hereinafter described, oil is supplied to the chambers 46 and 47 under controlled conditions. With maximum engaging pressure supplied to the chamber 46, it is apparent that converter drive to the turbine shaft 24 will be transmitted successively through the gear 30, clutch stack 31, and hub 32 to the output shaft 34.

For reverse drive and still referring to FIG. 1, the gear 30 meshes with a gear 48 whose hub is journaled on a beam 49 that is supported at one end by the housing wall 29 and at the opposite end by an end wall (not shown) of the housing 16. As with the gear 30, the gear 48 is internally splined for driving and relative sliding engagement with a plurality of alternate clutch plates forming part of a reverse clutch stack 50. The intervening or driving plates of this stack have driving and relative sliding engagement with a hub 51 by means of a plurality of keys 52 spaced around and connected to the hub 51. The hub 51 is secured by a plurality of pins 53, only one being shown, to the hub 54 of a gear 55 that is journaled on the beam 49 and the gear 55 meshes with a suitably supported gear 56, fragmentarily shown in elevation, which meshes with the gear 44. The gear 56 is intended to represent the conventional idler in a typical reverse gear train.

Interposed between and in abutting relation to the opposed ends of the hubs 51 and 54 is an annular reaction plate 57 through which the pins 53 extend so that the hubs 51 and 54 and reaction plate 57 rotate together. Slidable on the periphery of the reaction plate 57 is an annular shell 58 which is integral at its left end with an annular piston 59 which grips the reverse clutch stack 50 against an abutment ring 60 that is preferably integral with the hub 51. The opposite end of the shell 58 is fast to an annular piston 61 whose inner portion is annularly flanged at 62 and spaced from the periphery of the hub 54 to define an annular throttling passage 63 for a purpose presently explained.

Included between the hub 51, reaction plate 57, shell 58 and piston 59 is a clutch engaging chamber 64, and between the hub 54, reaction plate 57, shell 58 and piston 61 is a balance chamber 65. As hereinafter described, oil is supplied to the chambers 64 and 65 under controlled conditions. With maximum engaging pressure supplied to the chamber 64 and less than maximum engaging pressure as subsequently defined supplied to the engaging chamber 46 of the forward clutch stack 31, drive from the turbine shaft 24 is transmitted successively through the gears 30 and 48, clutch stack 50, hubs 51 and 54, gears 55, 56 and 44, and hubs 42 and 32 to the output shaft 34.

The hydraulic system for the transmission, including a number of passages shown in FIG. 1 and presently identified, is schematically shown in FIG. 2 to which reference will now be made. For clarity in showing certain passages leading to the chambers and plate stacks of the respective clutches, the positions of the chambers and stacks are reversed from those shown in FIG. 1, but the functional relations are identical.

A pump 66 driven by the gear 14 (see FIG. 1) withdraws oil through a pipe 67 from a sump 68 which may be provided by the lower part of the housing 16 and discharges successively through a filter 69 and a heat exchanger 70 to a pipe 71 connecting with the inlet of a conventional pressure regulating valve 72 which under operating conditions and by way of example will be assumed to maintain a pressure of 150 p.s.i. in the pipe 71. It will be understood that the pump 66 may be provided with conventional relief means (not shown) as a safeguard against excessive pressure.

The outlet of the pressure regulating valve 72 connects through a pipe 73 and a connecting passage 74 (see FIG. 1) in the wall 29 and sleeve 17 with the inlets of the impeller blades 18. Still referring to FIG. 1, the converter 12 discharges between the turbine and stator blades 20 and 21, respectively, into an annular chamber 75 included between the turbine shaft 24 and rings 23 and 26 and from the chamber 75, the oil flow divides along two paths, respectively, leading to certain parts of the forward and reverse clutch assemblies as presently described.

For the forward clutch assembly, flow from the chamber 75 is through a passage 76 included between the sleeve 17 and turbine shaft 24 and thence through a radial passage 77 in the shaft 24 into a chamber 78 included between the end of the counterbore 35 and the adjacent end of the output shaft 34. The latter shaft is drilled from the left end thereof to provide coaxial, cylindrical cavities 79, 80 and 81 having successively decreasing diameters, respectively, and a plug 82 fits within the largest diameter cavity 79 and supports one end of a tube 83 whose opposite end fits snugly in the smallest diameter cavity 81 for a purpose presently explained. The diameters of the cavity 80 and tube 83 are such as to include therebetween a longitudinal annular passage 84.

The left end of the passage 84 connects through a passage 85 included between the cavity 79 and plug 82 with the chamber 78 and the right end with radial passages 86 in the output shaft 34. The delivery ends of the passages 86 connect successively through an annular channel 87, a radial passage 88 and a throttling orifice 89 in the gear hub 42 with the balance chamber 47. The radial passage 88 also connects successively through a throttling orifice 90 in the hub 42, and passages 91 and 92 in the reaction plate 39 and hub 32, respectively, with a plurality of radial passages 93 for feeding cooling oil to the inner edges of the plates of the forward clutch stack 31.

The other flow path from the annular chamber 75 leads to certain parts of the reverse clutch assembly. Specifically, the chamber 75 connects through a passage 94 in the sleeve 17 and wall 29 with one end of a pipe 95 that extends upwardly for connection with a passage 96 in the upper portion of the wall 29.

Mounted in the lower portion of the wall 29 is a conventional pressure regulating valve 97 having a relief port 98 communicating with the sump 68, the inlet of the valve 97 communicating through a passage 99 with the passage 94 and thus establishing in the latter passage a determined pressure, assumed by way of example to be 40 p.s.i. As clearly shown in FIG. 2, the regulating valve 97 is in back pressuring relation to the regulating valve 72 and the pressure determined by the former valve during operation of the pump 66 at any speed of the engine is basic and constant in the converter 12 and in the two flow paths leading from the annular chamber 75 as fully described for the forward clutch assembly and as will now be described for the remainder of the flow paths leading to the reverse clutch assembly.

Still referring to FIG. 1, the delivery end of the passage 96 connects through an annular channel 100 around the periphery of the beam 49 and radial passages 101 in the beam 49 with one end of an annular passage 102 extending longitudinally of the beam 49. The passage 102 is included between a longitudinal tube 103 and a longitudinal beam cavity 104 which defines one wall of the passage 102. The tube 103 is provided for a purpose presently explained and its left end is supported by a plug 105 which closes the adjacent end of the passage 102 and its opposite end fits snugly in a reduced portion of the cavity 104 and closes the opposite or adjacent end of the annular passage 102.

The right end of the passage 102 connects through radial passages 106 in and an annular channel 107 around the periphery of the beam 49 with a radial passage 108 leading to the balance chamber 65 and including a throttling orifice 109. The passage 108 also connects through a throttling orifice 110 in the gear hub 54 with aligned passages 111 and 112 in the reaction plate 57 and clutch hub 51, respectively, with radial passages 113 for feeding cooling oil to the inner edges of the plates of the clutch stack 50.

In FIG. 2, the exigencies of the schematic drawing show certain features which appear different from the functionally identical features in FIG. 1 and correlation is necessary.

Referring to FIG. 2 and the forward clutch assembly, the numeral 114 collectively represents the clutch and gear hubs 32 and 42, respectively, and the numeral 115 collectively represents the adjacent portions of the turbine and output shafts 24 and 34, respectively. As shown also in FIG. 2, the passage 116 shown as connecting with the passage 88 collectively represents in FIG. 1 the passage 77 and the connected flow portions thereafter leading to the passage 88 as described above.

For the reverse clutch assembly, the numeral 117 collectively represents the clutch and gear hubs 51 and 54, respectively, and the passage 118 collectively represents the passages 101 and the connected flow portions thereafter leading to the passage 103 as described above.

Further in FIG. 2, the numeral 119, designating a pipe, represents the annular chamber 75 and connecting therewith are pipes 120 and 121, the former representing the passage 76 which leads to the passage 77 and thence to the passage 88 and the latter collectively representing the passage 94 and the connected flow portions thereafter leading to the passage 101 and thence to the passage 103.

Control on the oil pressure supply to the clutch engaging chambers 46 and 64 in conjunction with a control on the engine speed is accomplished by the following instrumentalities, reference being to FIG. 2.

One end of a pipe 122 connects with the pipe 71 anterior to the inlet of the regulating valve 72 and the opposite end connects with a parti-annular groove 123 provided interiorly of the cylindrical casing 124 of a control valve 125 and in which casing is rotatable a valve stem 126 as fragmentarily shown in FIG. 3. The stem 126 is provided with longitudinally spaced, generally wedge-shaped notches 127 and 128 extending transversely upwardly and downwardly, respectively, of the stem 126 for determined distances. In the position shown in FIG. 2, the groove 123 registers with the notch 127 in symmetrical and facing relation thereto and the relatively high pressure in the groove 123 and notch 127 is that established by the regulating valve 72.

One end of a pipe 129 connects with the pipe 122 anterior to the groove 123 and the opposite end connects with a parti-annular groove 130 in the casing 124 which registers and in the position shown is symmetrical with and in facing relation to the notch 128. The pipe 129 includes a throttling orifice 131 which provides for a reduced oil flow to the groove 130 under the control of a pressure regulating valve 132 having a relief port 133 communicating with the sump 68, the assumed pressure in the groove 130 being 3 to 7 p.s.i. This assumed pressure, as well as those suggested for the regulating valves 72 and 97 are not restrictive, only the relative order of magnitudes being important.

In the same transverse plane of the valve stem 126 which includes the notch 127, the casing 124 includes oppositely disposed, parti-annular grooves 134 and 135, and in the same transverse plane of the valve stem 126 which includes the notch 128, the casing 124 includes oppositely disposed, parti-annular grooves 136 and 137. The grooves 134 and 135 are symmetrical with respect to a diameter of the valve stem 126 that is normal to the diameter of the stem to which the groove 123 is symmetrical. The same relation exists between the grooves 136 and 137, and the groove 130. Pipes 138 and 139, respectively, connect the grooves 134 and 136, and the grooves 135 and 137.

The control valve 125, when the complete hydraulic system is operating, determines the value of hydraulic pressure applied to the engaging chambers 46 and 64 ranging from maximum pressure for full clutch engagement to a substantially lower pressure wherein the clutch plates are in incipient engagement with the plates of each clutch stack in sliding contact.

To cut off all pressure to the engaging chambers 46 and 64 and thus prevent drag and creep, such as when it is desired to change gear in the gear transmission of the equipment or when leaving the latter unattended, an off-and-on valve 140 is employed. This valve includes a casing 141 in which is reciprocable a spool-type valve stem 142 having lands 143, 144 and 145, the first two lands being spaced by an annular groove 146 and the last two lands being spaced by an annular groove 147. The casing 141 includes an inlet port 148 that connects by a pipe 149 with the pipe 138 and another inlet port 150 that connects by a pipe 151 with the pipe 139. The casing 141 also includes drain ports 152 and 153 which connect with a manifold 154 leading from the spring actuated side of the regulating valve 72 to the sump 68 for draining leakage past this valve and for also exhausting the engaging chambers 46 and 64 as presently described.

The casing 141 further includes outlet ports 155 and 156 and connected thereto are the inlet ends of pipes 157 and 158 leading to the forward and reverse clutch assemblies, all respectively. The opposite end of the pipe 157 (see FIG. 1) connects successively through a passage 158 in the sleeve 17 and radial passages 159 and 160 in the turbine and output shafts 24 and 34, respectively, with one end of the tube 83. The opposite end of the tube 83 connects successively through radial passages 161 in the output shaft 34, passages 162 and 163 in the gear hub 42 and reaction plate 39, respectively, and a groove 164 recessed in the end of the clutch hub 32 with the forward engaging chamber 46. For convenience, the passages 158, 159 and 160, tube 83, passages 161, 162 and 163, and the groove 164 are collectively indicated by the numeral 165 in FIG. 2.

Referring to FIG. 1 and considering the reverse clutch assembly, the opposite end of the pipe 158 connects successively through passages 166 and 167 in the housing wall 29 and beam 49, respectively, with one end of the tube 103. The opposite end of the tube 103 connects successively through radial passages 169 and 170 in the gear hub 54 and reaction plate 57, respectively, and a groove 171 recessed in the end of the clutch hub 51 with the reverse engaging chamber 64. For convenience, the passages 166 and 167, tube 103, passages 168, 169 and 170, and the groove 171 are collectively indicated by the numeral 172 in FIG. 2.

Another feature of the transmission is the simultaneous control of engine speed and pressure control on the clutches. Referring to FIG. 4, the valve stem 126, externally of the valve casing 124, is provided with a parti-circular detent 173 provided at the upper end of the vertical diameter of the stem 126 and in which rests, whenever the engine is idling, a roller 174 carried by one end of an intermediately pivoted lever 175. The opposite end of the lever 175 is pivotally connected through a link-lever mechanism, generally indicated by the numeral 176, to a throttle valve 177 operating in the usual intake pipe 178 of an internal combustion engine (not shown). The throttle valve is intended to represent any control on the fuel supply to an internal combustion engine.

In the same transverse plane of the valve stem 126 which includes the detent 173, cam lobes 179 and 180 extend oppositely from the stem 126 in symmetrical relation to the vertical diameter of the stem and in the relation shown to the notches 127 and 128. The lobe 179 includes an engine speed rise, cam surface 181 which at one end merges into the surface of the valve stem 126 short of the detent 173 to include therebetween a parti-circular cam surface 182 and at the opposite end terminates in a parti-circular detent 183 for receiving the roller 174. It will be apparent that when the roller 174 rests in the detent 183, it is at a greater distance from the axis of the valve stem 126 than when in the position shown in FIG. 4 to thereby open the throttle valve 177. The cam lobe 180 is identical with the cam lobe 179 and hence includes a speed rise cam surface 184 and detent 185 similar to the surface 181 and detent 183, respectively. A parti-circular cam surface 186 provided by the surface of the valve stem 126 is also included between the detent 173 and the cam surface 184, the cam surfaces 182 and 186 having the same radius.

Before describing the operation of the transmission, it will be understood that the control valve 125 is viewed in the same direction in FIGS. 2 to 7, inclusive, namely, from the exposed end of the valve stem 126 as shown in FIG. 3, or from the end as viewed in FIG. 4.

Considering the operation of the transmission and with the valve stem 126 in the position shown in FIGS. 2 and 4, the off-and-on valve 140 in the raised position shown in FIG. 2, and the gear box in neutral, the engine is idling since the roller 174 occupies the detent 173 and the pump 66 is operating. Accordingly, the portion of the hydraulic circuit beginning with the pipe 73 is filled with oil, including the hydraulic torque converter 12 and the balance chambers 47 and 65, and cooling oil is continuously fed to the plates of the clutch stacks 31 and 50 through the indicated pipes and passages (see FIG. 2). Oil supplied to the balance chambers 47 and 65 is continuously discharged through the annular throttling passages 43 and 63, respectively, under all conditions of operation, pump 66 running, to the sump 68.

Oil flowing through the pipe 122 to the groove 123 is masked by the valve stem 126 in the position shown in FIG. 2. Further, while the oil flowing through the pipe 129 enters the notch 128, discharge therefrom through the pipe 149 is masked by the land 145 of the off-and-on valve 140 and discharge successively through the pipes 139 and 151 is masked by the land 144. Also, discharge from the notch 128 through the pipe 139 to the groove 135 is masked by the valve stem 126. Pressure oil of any value is therefore prevented from reaching the engaging chambers 46 and 64 and the clutch stacks 31 and 50 stand released under whatever pressure exists in the balance chambers 47 and 65. At this time, the engaging chambers 46 and 64 are connected to the sump 68. Specifically, for the chamber 46, this drain connection (see FIG. 2) is through the passage 165, pipe 157, annular groove 147 and thence to the pipe 154. For the chamber 64, the drain connection is through the passage 172, pipe 158, annular groove 146 and thence to the pipe 154.

To start the vehicle with the hydraulic circuit conditioned as above, the operator first selects the proper gear ratio in the gearbox and shifts the off-and-on valve 140 to its lower position wherein the land 145 abuts the lower end of the casing 141. The lands 143 and 144 then mask the drain ports 152 and 153 hitherto connected to the engaging chambers 64 and 46, all respectively, and the inlet ports 148 and 150 are placed in communication with the outlet ports 155 and 156 and hence with the engaging chambers 46 and 64, all respectively.

The high pressure oil in the pipe 122 is still masked by the control valve stem 126, but the low pressure oil in the pipe 129, 3 to 7 p.s.i., is not. The latter oil flows from the notch 128 through the ports 148 and 155 to the forward engaging chamber 46, and also through the pipes 139 and 151 and the ports 150 and 156 to the reverse engaging chamber 64. The low pressure oil accordingly takes up the hydraulic freeplay in each clutch assembly, the piston 37 moving to the right and placing the plates of the forward clutch stack 31 in relative sliding contact and the piston 59 performing likewise with respect to the plates of the reverse clutch stack 50. The plates of each clutch stack are maintained in this relatively slight friction condition, except when either clutch stack is fully or further partly engaged at appropriate higher pressures, or when the off-and-on valve 140 is restored to the position shown in FIG. 2. When one clutch stack is fully or further partly engaged as indicated, the other clutch stack remains in the relatively slight friction condition.

So far as described, the stem 126 of the control valve 125 is in the position shown in FIGS. 2 and 4 so the engine throttle valve 177 is in the idling position. With the engine idling, it will be understood that the capacity of the pump 66 is sufficient to maintain the indicated basic pressure of 40 p.s.i. in the converter circuit.

Assuming forward movement is desired, the control valve stem 126 is slowly rocked clockwise by an appropriate handle (not shown) and its initial movement throttles the high pressure oil (FIG. 5, upper section) to the groove 134 and pipes 138 and 149 and thence through the ports 148 and 155 to the forward engaging chamber 46 and continued movement reduces the throttling action between the notch 127 and groove 134 and simultaneously therewith increases the throttling action between the groove 136 and notch 128. The pressure rise in the pipe 138, then communicating with the engaging chamber 46, is therefore gradual and continuous up to the maximum value available in the pipe 122 and at this time, the groove 136 is completely blocked (FIG. 6, lower section).

During this phase and referring to FIG. 4, the roller 174 has moved along the constant radius cam surface 182 up to its junction with the speed rise cam surface 181. This movement of the roller 174 accordingly does not vary the idling position of the throttle valve 177 so that the supply of pressure to the forward engaging chamber 46 is effected with the engine idling. The rotation of the valve stem 126 is continued to the limiting position shown in the upper section of FIG. 7 wherein the maximum pressure supply is maintained and during which phase the roller 174 moves along the speed rise cam surface 181 to gradually increase the engine speed until it rests in the detent 183 when the throttle valve 177 is fully opened. During all of the foregoing action, the valve stem 126 masks the groove 135 which connects with the low pressure oil supply in the notch 128.

It will be particularly noted that the clutch stack 31 is fully engaged while the engine is idling and that thereafter the engine speed is gradually raised, the cam surface 181 being shaped to achieve this result. This procedure insures that full advantage is taken of the inherently smooth action of the system in increasing the applied pressure and thereby controlling clutch slip in effecting acceleration of the vehicle, the full engagement of the clutch stack 31 being substantially free of jerk due to the characteristics of the pressure control.

While the above operation is proceeding for the forward clutch assembly, the indicated clockwise rotation of the control valve stem 126 cuts off the low pressure oil supply hitherto moving from the notch 128 through the pipes 138 and 149 and ports 148 and 155 to the forward engaging chamber 46 (see the lower sections in FIGS. 5, 6 and 7). The low pressure supply, however, is maintained to the reverse engaging chamber 64, this supply moving from the notch 128 through the pipes 139 and 151, ports 150 and 156, and ensuing pipes and passages (see FIG. 2).

With the transmission conditioned as above for forward movement, reverse movement is obtained simply by first returning the control valve stem 126 from its clockwise rocked position as described above and as shown in FIG. 7 to the positions shown in FIGS. 2 and 4. This step immediately reduces the engine fuel supply to idling value and gradually reduces the high pressure supply to the forward engaging chamber 46 and substitutes therefor the low pressure determined by the regulating valve 132, the reverse engaging chamber 64 being already so conditioned.

With the valve stem 126 in the position shown in FIG. 4, the operator waits for the engine speed to drop to idle and then rocks the valve stem 126 counterclockwise until the roller 174 rests in the detent 185. Exactly the same operation then occurs for the reverse clutch assembly as described for the forward clutch assembly, namely, during traverse of the cam surface 186 by the roller 174, pressure is supplied to the reverse engaging chamber 64 in the same gradual manner as indicated for the forward engaging chamber 46 while the engine remains at idling speed and thereafter the engine speed is gradually increased. During this operation, low pressure supply is maintained to the forward engaging chamber 46.

From the foregoing, it will be apparent that not only is the pressure gradually supplied to the respective engaging chambers at a time when the plates of each clutch stack are in relative sliding contact and the engine is idling, but that thereafter the engine speed is gradually increased to provide maximum power. This procedure insures smooth performance. Further, for any gear ratio in the gearbox, forward to reverse and reverse to forward movements are achieved merely by rotating the control valve stem 126 in the appropriate direction. When a change in gear ratio is indicated, the pressure in the engaging chambers 46 and 64 is reduced to 3 to 7 p.s.i. by rocking the control valve 125 to the position shown in FIG. 2, or the off-and-on valve 140 is shifted to the position shown in FIG. 2 which removes pressure from the engaging chambers 46 and 64. This also drops the engine speed to idle and after the gear shift has been made, the procedure thereafter is as outlined above.

We claim:

1. A power transmission comprising fuel control means for an engine connectible thereto as a power source, a hydraulic circuit including a hydraulically actuated, friction plate clutch and valve means movable between positions determining a supply of relatively low and high pressure liquid to the clutch to respectively establish a relaitve sliding and torque transmitting contact of the clutch plates, and means connected to the fuel control means and triggered by the valve means for determining an idling position of the fuel control means until the shift from said low to said high pressure supply is completed and to thereafter further open the fuel control means.

2. A power transmission as defined in claim 1 wherein the triggering of the means connected to the fuel control means is effected by means carried by the valve means.

3. A power transmission as defined in claim 2 wherein the valve means includes a rockable valve stem and cam means carried thereby for triggering the means connected to the fuel control means.

4. A power transmission comprising fuel control means for an engine connectible thereto as a power source, a hydraulic circuit including a pair of hydraulically actuated friction plate clutches and valve means common to both clutches and movable between a position determining a supply of relatively low pressure liquid simultaneously to both clutches to establish a relative sliding contact of the respective clutch plates and a variable position maintaining the supply of said low pressure liquid to one clutch and regulating a supply of relatively high pressure liquid to the other clutch to establish a selected torque transmitting contact of the plates thereof, and means connected to the fuel control means and triggered by the valve means for determining an idling position of the fuel control means until the shift from said low to said high pressure supply is completed for either clutch and to thereafter further open the fuel control means.

5. A power transmission as defined in claim 4 wherein the valve means includes a rockable stem having a midposition determining the supply of low pressure liquid simultaneously to both clutches and a rocked position on one side of the mid-position for maintaining the low pressure supply to one clutch while maintaining the high pressure supply to the other clutch.

6. A power transmission as defined in claim 5 wherein cam means carried by the valve stem triggers the means connected to the fuel control means.

7. A power transmission having an output and comprising an hydraulic torque converter having an output, fuel control means for an engine connectible to the converter input, a clutch including a plurality of friction plates respectively connected to the outputs of the converter and transmission, a reaction plate held against movement axially of the transmission, an annular casing surrounding and shiftable relative to the reaction plate and having end walls defining with the reaction plate variable volume, balance and clutch engaging chambers, respectively, a pressure liquid source, first and second hydraulic circuits connected to the liquid pressure source, the first circuit including the converter and throttled passages leading to the balance chamber and to the clutch plates for cooling, respectively, the balance chamber being throttingly connected to a sump, and the second circuit including the engaging chamber and valve means movable between positions determining a supply of relatively low and high pressure liquid to the engaging chamber to respectively establish a relative sliding and a selected torque transmitting contact of the clutch plates, and means connected to the fuel control means and triggered by the valve means for determining an idling position of the fuel control means until the shift from said low to said high pressure supply is completed and to thereafter further open the fuel control means.

8. A power transmission as defined in claim 7 wherein the valve means includes a rockable stem and cam means carried thereby for triggering the means connected to the fuel control means.

9. A power transmission having an output and comprising an hydraulic torque converter having an output, fuel control means for an engine connectible to the converter input, first and second clutches each including a plurality of friction plates respectively connected to the outputs of the converter and transmission, a reaction plate held against movement axially of the associated clutch and an annular casing surrounding and shiftable relative to the associated reaction plate and having end walls defining with the reaction plate variable volume, balance and clutch engaging chambers, a pressure liquid source, first and second hydraulic circuits connected to the pressure liquid source, the first hydraulic circuit including the converter and throttled passages leading to the balance chambers and plates of the first and second clutches, each balance chamber being throttlingly connected to a sump, and the second hydraulic circuit including the engaging chambers of the first and second clutches and valve means common to both clutches and movable between a position determining a supply of relatively low pressure liquid simultaneously to the engaging chambers of the first and second clutches to establish a relative sliding contact of the clutch plates, respectively, and a variable position maintaining the supply of said low pressure liquid to the engaging chamber of one clutch and regulating a supply of relatively high pressure liquid to the engaging chamber of the other clutch to establish a selected torque transmitting contact of the plates thereof, and means connected to the fuel control means and triggered by the valve means for determining an idling position of the fuel control means until the shift from said low to said high pressure supply is completed for either clutch and to thereafter further open the fuel control means.

10. A power transmission as defined in claim 9 wherein the valve means includes a rockable stem having a midposition determining the supply of low pressure liquid simultaneously to the engaging chambers of both clutches and a rocket position on one side of the mid-position for maintaining the low pressure supply to the engaging chamber of one clutch while establishing the high pressure supply to the engaging chamber of the other clutch.

11. A power transmission as defined in claim 10 wherein cam means carried by the valve stem triggers the means connected to the fuel control means.

12. A power transmission comprising an output shaft, an hydraulic torque converter having an impeller and a turbine connected to a shaft coaxial with and partially enclosing the adjacent end of the output shaft, fuel control means for an engine providing a power source for and connectible to the impeller, forward and reverse clutches positioned in substantially coplanar relation radially of the transmission and each including a plurality of friction plates respectively connected to the turbine and output shafts, the reverse clutch being connected through a gear train imparting reverse motion to the output shaft, each clutch further including a reaction plate held against movement axially of the associated clutch and an annular casing surrounding and shiftable relative to the reaction plate and having end walls defining with the reaction plate, variable volume, balance and clutch engaging chambers, respectively, a pressure liquid source, first and second hydraulic circuits connected to the pressure liquid source, the first circuit including the converter and throttled passages leading to the balance chambers and plates of the forward and reverse clutches and partially included in the adjacent ends of the turbine and output shafts, and the second circuit including the engaging chambers of the forward and reverse clutches and valve means common to both clutches and movable between a position determining a supply of relatively low pressure liquid simultaneously to the engaging chambers of the forward and reverse clutches to establish a relative sliding contact of the clutch plates, respectively, and a variable position maintaining the supply of said low pressure liquid to the engaging chamber of one clutch and regulating a supply of relatively high pressure liquid to the engaging chamber of the other clutch to establish a selected torque transmitting contact of the plates thereof and means connected to the fuel control means and triggered by the valve means for determining an idling position of the fuel control means until the shift from said low to said high pressure supply is completed for either clutch and to thereafter further open the fuel control means.

13. A power transmission as defined in claim 1 wherein the valve means exercises control on the high pressure supply to obtain any desired torque transmitting contact of the clutch plates.

14. A power transmitting structure comprising an hydraulically actuated, friction plate clutch, a pressure liquid source, relatively low and high pressure lines leading from the source, and valve means common to the pressure lines and the clutch and movable between a position determining a supply of relatively low pressure liquid to the clutch to establish a relative sliding contact of the clutch plates that is substantially free of torque transmission and a variable position regulating a supply of relatively high pressure liquid to the clutch to establish a selected torque transmitting contact of the plates thereof.

15. A power transmitting structure comprising a pair of hydraulically actuated, friction plate clutches, a pressure liquid source, relatively low and high pressure lines leading from the source, and valve means common to the pressure lines and both clutches and movable between a position determining a supply of relatively low pressure liquid simultaneously to both clutches to establish a relative sliding contact of the respective clutch plates that is substantially free of torque transmission and a variable position maintaining the supply of said low pressure liquid to one clutch and regulating a supply of relatively high pressure liquid to the other clutch to establish a selected torque transmitting contact of the plates thereof.

16. A power transmitting structure as defined in claim 14 wherein the valve means includes inlet ports respectively communicating with the low and high pressure lines and a discharge port connectible with the inlet ports and clutch, and a control member for simultaneously controlling flow from the inlet ports to the discharge port in any variable ratio between the low and high pressures.

References Cited in the file of this patent

UNITED STATES PATENTS

| | | |
|---|---|---|
| 2,732,048 | Forster et al. | Jan. 24, 1956 |
| 2,737,059 | Perkins | Mar. 6, 1959 |
| 2,868,341 | Snoy | Jan. 13, 1959 |
| 2,920,732 | Richards | Jan. 12, 1960 |
| 2,953,940 | Slemmons | Sept. 27, 1960 |